United States Patent [19]

Bauer et al.

[11] Patent Number: 4,780,003
[45] Date of Patent: Oct. 25, 1988

[54] CLEARANCE-FREE BEARING BUSHING

[75] Inventors: Bernhard Bauer, Hassfurt; Burkhard von Bredow, Kutzberg, both of Fed. Rep. of Germany

[73] Assignee: SKF GmbH, Schweinfurt, Fed. Rep. of Germany

[21] Appl. No.: 101,291

[22] Filed: Sep. 25, 1987

[30] Foreign Application Priority Data

Nov. 26, 1986 [DE] Fed. Rep. of Germany ... 8631594[U]

[51] Int. Cl.⁴ .......................................... F16C 41/04
[52] U.S. Cl. ................................. 384/448; 384/563; 384/624; 384/905.1
[58] Field of Search ............... 384/448, 624, 563, 581, 384/582, 571, 905.1

[56] References Cited

U.S. PATENT DOCUMENTS

| 3,501,207 | 3/1970 | Pritchard | 384/448 |
| 4,201,425 | 5/1980 | Freund | 384/448 |
| 4,398,777 | 8/1983 | Murphy | 384/448 |
| 4,553,858 | 11/1985 | Neugebauer et al. | 384/563 |

Primary Examiner—Lenard A. Footland
Attorney, Agent, or Firm—Eugene E. Renz, Jr.

[57] ABSTRACT

A clearance-free bearing bushing for universal joints which has a plurality of conical rollers located between a bearing bushing and a journal pin or the like. The rollers are pressed against their raceways by a spring element with a predetermined tension. On the side of the conical rollers facing away from the spring element, there is a thrust ring or the like, made of resilient material, which is free to move axially and which rests against the end surface of the conical rollers.

5 Claims, 1 Drawing Sheet

CLEARANCE-FREE BEARING BUSHING

FIELD OF THE INVENTION

The present invention relates to bearing bushings. The invention has particular application to clearance-free bushings for use in universal joints having conical rollers located between a bearing bushing and a journal pin or the like wherein the rollers are pressed against the raceways by a spring element with a predetermined tension.

BACKGROUND OF THE INVENTION

Bearings bushings of this general type are not new per se. For example, West German Offenlegungsschrift No. 1,926,408 shows a prior bearing bushing of this type which has certain disadvantages and drawbacks. For example, when these known bearing bushings are pressed into the eye of the universal joint forkhead, the conical rollers can lock between the raceway or the bearing bushing and the roller path on the journal pin. This, of course, produces damage to the raceways and the lateral surfaces of the conical rollers and premature failure of the bearing.

SUMMARY OF THE INVENTION

With the foregoing in mind, it is an object of the present invention to provide a clearance-free bearing bushing characterized by novel features of construction and arrangement which precludes damage to the raceway and the bearing bushing and the roller path on the journal pin or the like during assembly or installation. To this end, the bearing bushing of the present invention includes a thrust ring or the like made of a plastic material disposed on one side of the conical rollers facing away from the spring element. This ring is free to move axially as it rests against the end surfaces of the conical rollers. By this arrangement, during assembly of the elements of the universal joint, the rolling elements can be displaced axially in an axial direction of the bearing bushing so that the force is transmitted across the bottom of the bearing bushing without the raceways or the rolling elements being damaged. After assembly has been completed, the conical rollers are biased against their raceways by the spring element to provide a clearance-free fit.

In accordance with another feature of the present invention, the thrust ring is provided with a plurality of pins distributed about the periphery on the side of the conical rollers facing the bottom of the bearing bushing which engage in axial bores in the bottom of the bearing bushing. This arrangement prevents dir particles or the like from intruding from the outside environment into the bearing bushing.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
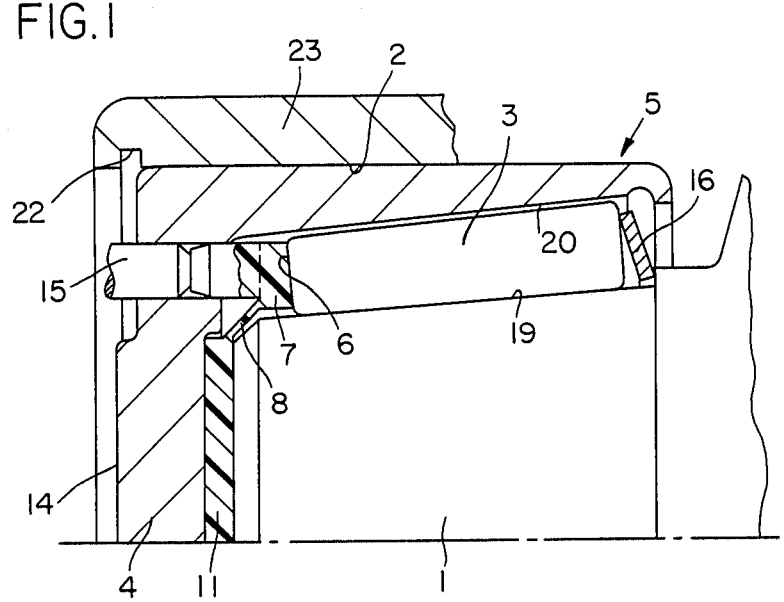
FIG. 1 is a longitudinal sectional view through universal joint bushing according to the present invention showing an axially displaced set of rolling elements with radial clearance between the conical rollers and the outer raceway.
Figure 2:
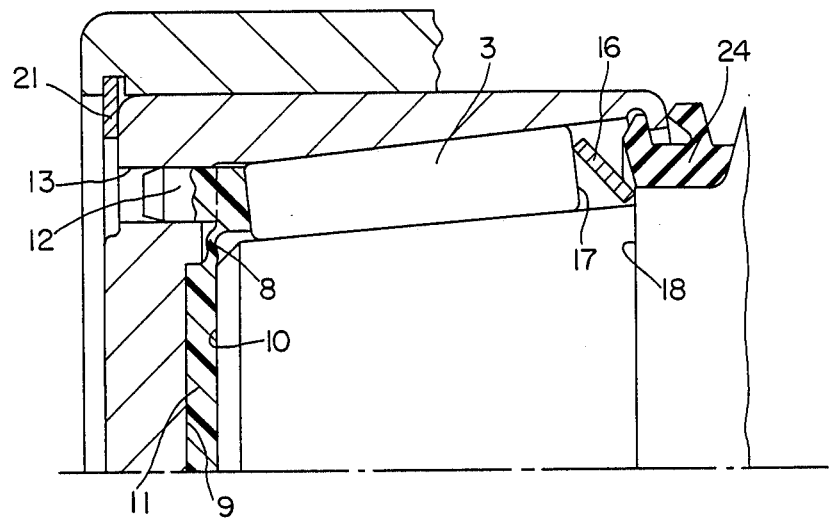
FIG. 2 is a similar longitudinal cross-sectional view of the universal joint bushing in accordance with the present invention showing the conical rollers adjusted without clearance or play.

Referring now to the drawings, and particularly to FIG. 1 thereof, there is shown a journal pin 1 of a universal joint assembly supported in the eye 2 of the fork on conical rollers 3. The conical rollers comprise a full set which engage in an annular bearing bushing 5 having a bottom 4. A thrust ring 7 made of a plastic material bears against the axial end surfaces 6 of the conical rollers which is the small roller diameter end of the rollers. A thrust ring 7 is connected before installation of the bearing to a slide disk 11 of low-friction material located between the bottom surface 9 and the end surface 10 of journal pin 1 by way of a thin retaining section 8. Thus, the bearing bushing 5 consists of only a few individual parts before installation.

As illustrated, the thrust ring 7 has three pins 12 distributed about the periphery which project from the thrust ring on the side facing bottom 4 of the bearing bushing 5, the pins 12 engaging in axial bores 13 in bottom 4 of bearing bushing 5 in a sliding manner so that the bushing is sealed.

During installation, bearing bushing 5 is pressed into fork eye 2 by a suitable well-known tool (not shown) which acts on the outer bottom surface 14. Thrust ring 7 is pressed axially inwardly by bolt 15 (see FIG. 1) which acts from the outside on pin 12 on thrust ring 7 so that the conical rollers 3 are displaced in the axial direction against the action of a cup-spring 16 located between end surfaces 17 of the conical rollers 3 and the radial surface 18 of journal pin 1. Consequently, conical rollers 3 and contact surfaces 19 and 20 are protected in a manner to obviate damage. After bearing bushing 5 has been pressed into fork eye 2, bolts 15 are retracted and the conical rollers 3 are pressed by cup-spring 16 into the space between the contacting surfaces 19 and 20 in a clearance-free manner.

After spring 21 has been inserted in a groove 22 of fork 23, and after installing sealing ring 24 in the open end of bearing bushing 5, the unit is ready for operation. As soon as a relative movement occurs between journal pin and bearing bushing 5, the thin retaining sections 8 between slide disk 11 and thrust ring 7 are broken since the relative speed of the entire set of rolling elements is different from that of journal 1.

Even though particular embodiments of the present invention have been illustrated and described herein, it is not intended to limit the invention and changes and modifications may be made therein within the scope of the following claims.

What is claimed is:

1. A clearance-free bearing bushing for universal joints having a plurality of conical rollers located between a bearing bushing and a journal pin, wherein the rollers are pressed against their raceways by a spring element with a predetermined tension, characterized in that, on the side of the conical rollers (3) facing away from the spring element, there is a thrust ring (7), made of resilient material, which is free to move axially and which rests against the end surface (6) of the conical rollers (3).

2. A clearance-free bearing bushing according to claim 1, characterized in that the thrust ring (7) is provided with several pins (12) distributed around its periphery on the side facing the bottom (4) of the bearing bushing (5), said pins engaging in axial bores (13) in the bottom (4) of the bearing bushing (5).

3. A clearance-free bearing bushing according to claim 2, characterized in that the bores (13) extend axially through the entire thickness of the bottom (4) of the bushing.

4. A clearance-free bearing bushing according to claim 2, characterized in that the thrust ring (7) is connected before assembly by means of thin retaining sections (8) to a slide disk (11), which is provided between the bottom surface (9) and the end surface (10) of the journal pin (1).

5. A clearance-free bearing bushing according to claim 1, including a cup spring (16), which is braced against the end surfaces (17) of the conical rollers (3) and a radial surface (18) of the journal pin (1).

* * * * *